Figure 1:
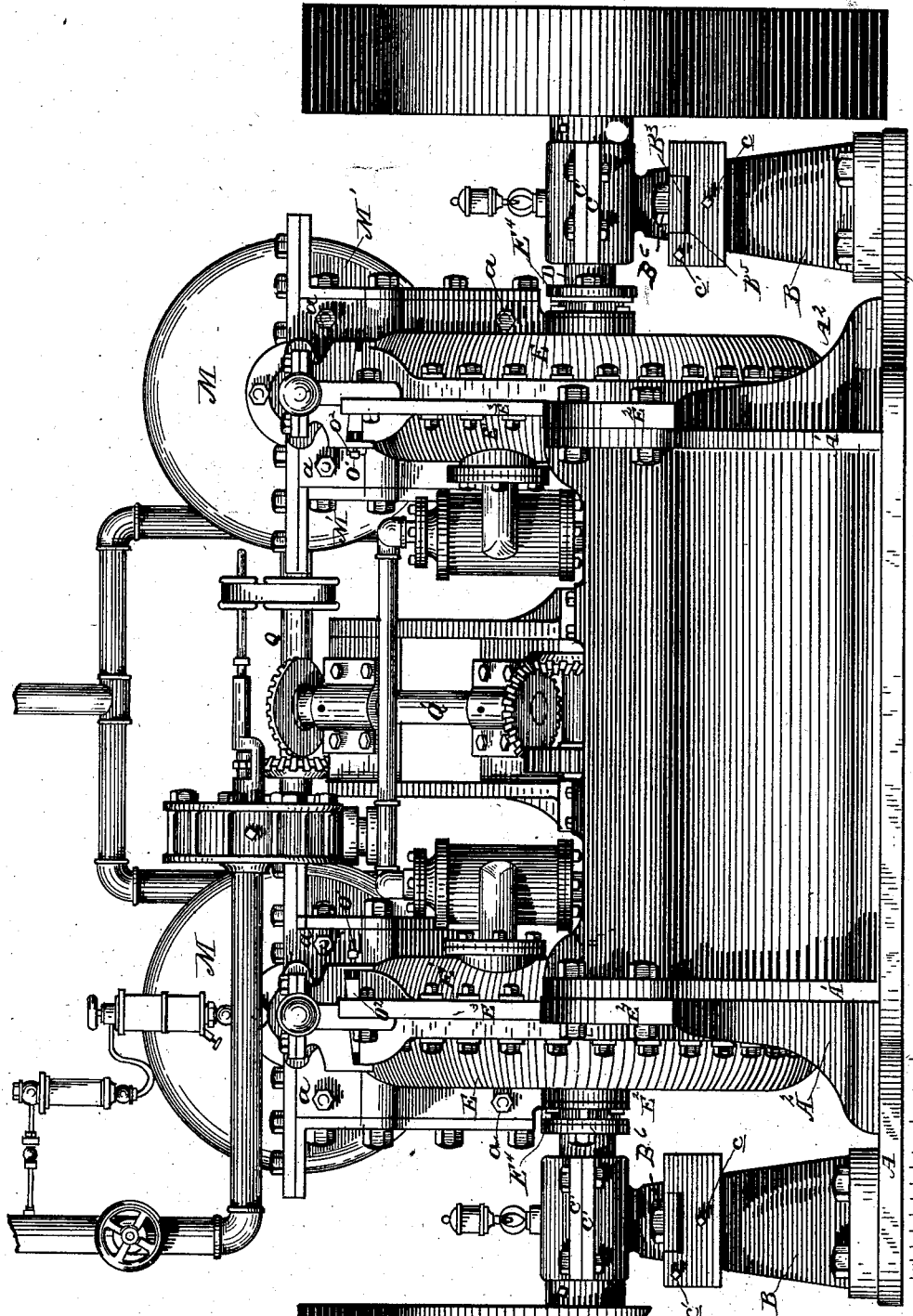

(No Model.) 6 Sheets—Sheet 2.

L. J. WING.
ROTARY ENGINE.

No. 259,965. Patented June 20, 1882.

Witnesses:
Inventor:
Leander J. Wing (No Model.) 6 Sheets—Sheet 3.

L. J. WING.
ROTARY ENGINE.

No. 259,965. Patented June 20, 1882.

Witnesses:
H. E. Remick,
Frank K. Bowen.

Inventor:
Leander J. Wing (No Model.) 6 Sheets—Sheet 4.

L. J. WING.
ROTARY ENGINE.

No. 259,965. Patented June 20, 1882.

Witnesses:
H. E. Remich,
Frank C. Niven

Inventor:
Leander J. Wing (No Model.) L. J. WING. 6 Sheets—Sheet 5.
ROTARY ENGINE.
No. 259,965. Patented June 20, 1882.
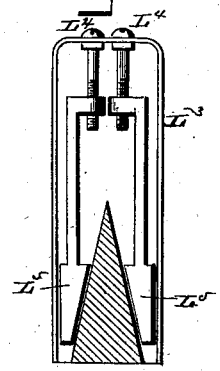
Fig.22.
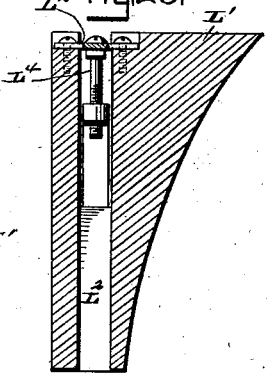
Fig.23.
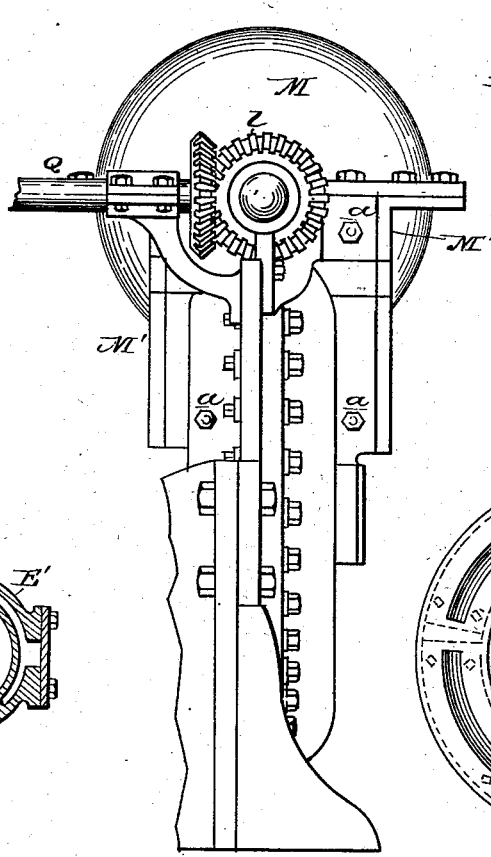
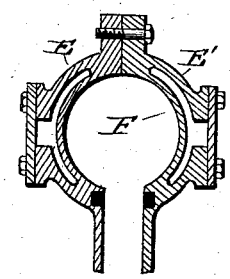
Fig.17.
Fig.18.
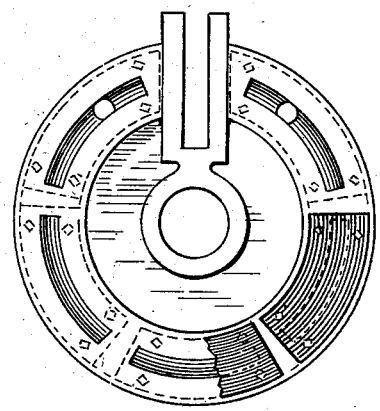
Fig.19.
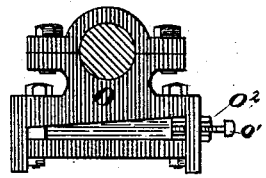
Fig.20.
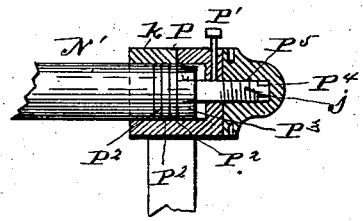
Fig.21.
Witnesses:
H. E. Remick,
Frank G. Bourn
Inventor:
Leander J. Wing (No Model.) 6 Sheets—Sheet 6.

L. J. WING.
ROTARY ENGINE.

No. 259,965. Patented June 20, 1882.

WITNESSES
E. J. Nottingham
Frank C. Bowen

INVENTOR
Leander J. Wing

UNITED STATES PATENT OFFICE.

LEANDER J. WING, OF LEXINGTON, MASSACHUSETTS.

ROTARY ENGINE.

SPECIFICATION forming part of Letters Patent No. 259,965, dated June 20, 1882.

Application filed November 28, 1881. (No model.)

*To all whom it may concern:*

Be it known that I, LEANDER J. WING, of Lexington, in the county of Middlesex and State of Massachusetts, have invented certain new and useful Improvements in Rotary Engines; and I do hereby declare the following to be a full, clear, and exact description of the invention, such as will enable others skilled in the art to which it pertains to make and use the same.

In the construction of a rotary steam engine that shall successfully compete with the reciprocating engines now in use, it is necessary that such a cylinder shall be used as shall best secure the advantages of automatic cut-off and expansion of steam. This result has hitherto been best attained by the use of the cylinder of the reciprocating engine, into which steam is introduced at the fore part of the stroke, at as near boiler-pressure as possible, and is then cut off at a point in the stroke where the remaining energy of the steam will be used up before it is exhausted from the cylinder. By these means the full expansive capacity of the steam is utilized. In order to secure this desired result, I use in my rotary engine a cylinder possessing, as near as possible, the features of the cylinder used in the reciprocating engine. My cylinder is from three to eight times the length of the above-named cylinder, and is bent into a circle to allow the piston (the outer ring of which fits the peculiar curve of the cylinder) to rotate in the cylinder, and thus avoid the reciprocating motion of the piston and its contingent parts. In order to render this plan practical, a movable abutment is required which shall satisfactorily perform the office of a cylinder-head, and then turn aside to allow the revolving piston to pass, and then resume its proper function again. Upon this abutment the efficiency and value of the engine are principally dependent. To attain any desired speed of piston or main shaft, the abutment must have a continuous movement. All experiments in this line of invention show that an abutment of a reciprocating or oscillating form of construction not only limits the speed of the piston or main shaft, but requires greater power to work it, since the momentum of the moving parts must be overcome at each revolution or oftener, thereby causing more friction, greater wear, and increased liability to need repairs. Hence I use a revolving-disk abutment so arranged that the thrust is taken on the end of its shaft, and the appliances for packing it steam-tight, for compensating for wear and a fine adjustment, are formed with special reference to avoid friction and insure durability. By these means is secured a harmonious combination of the best features of the reciprocating engine with the rotary principle.

Figure 2:
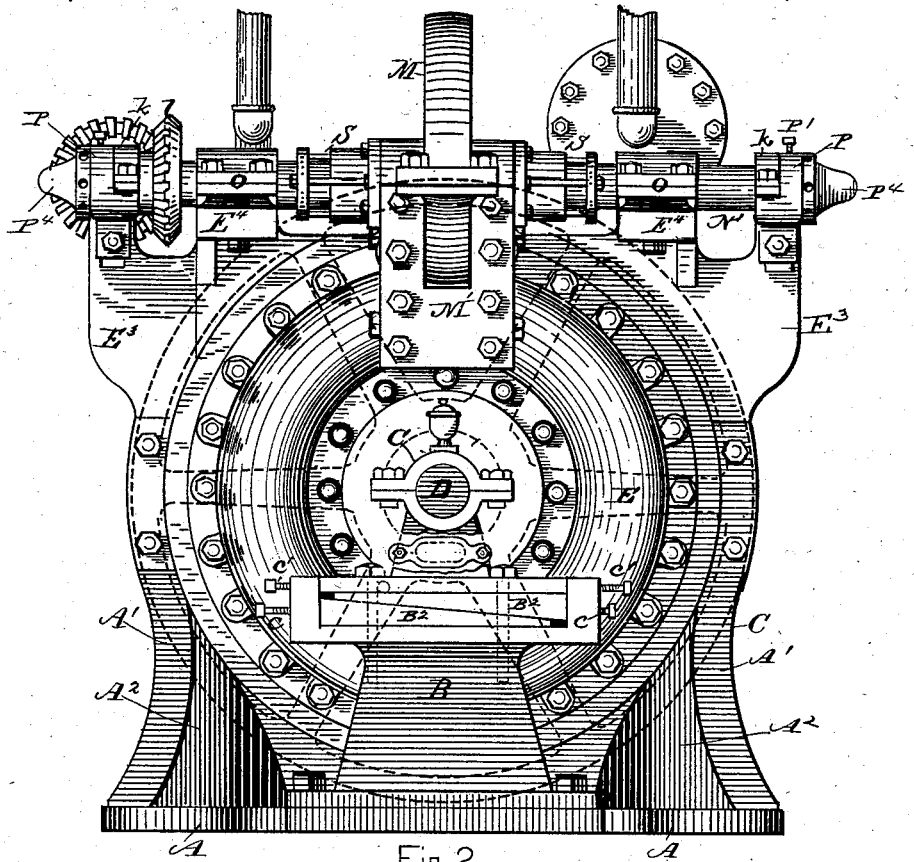
Figure 3:
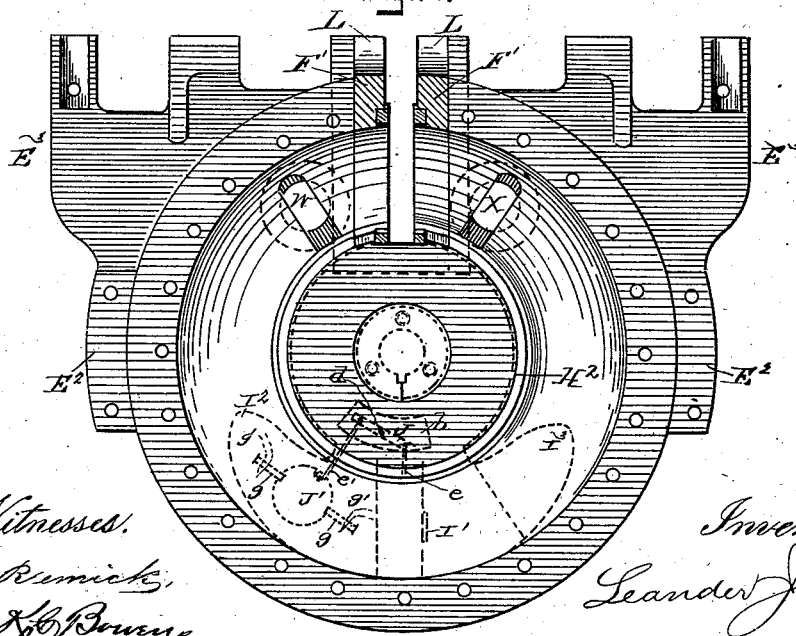
Figure 4:
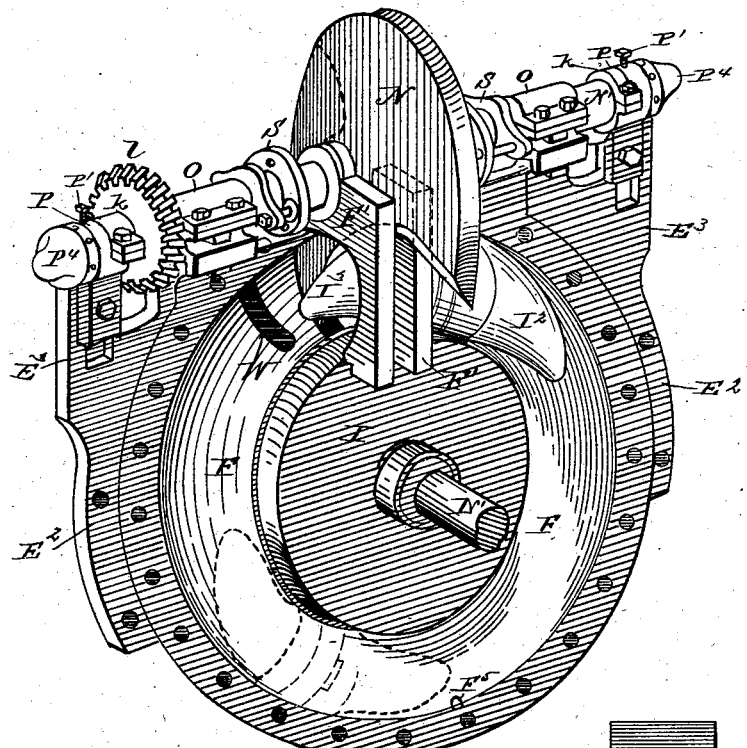
Figures 5, 6, 7, 9, 10:
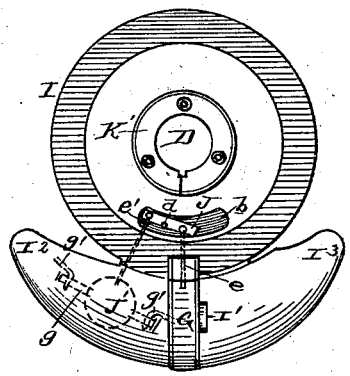
Figures 11, 12:
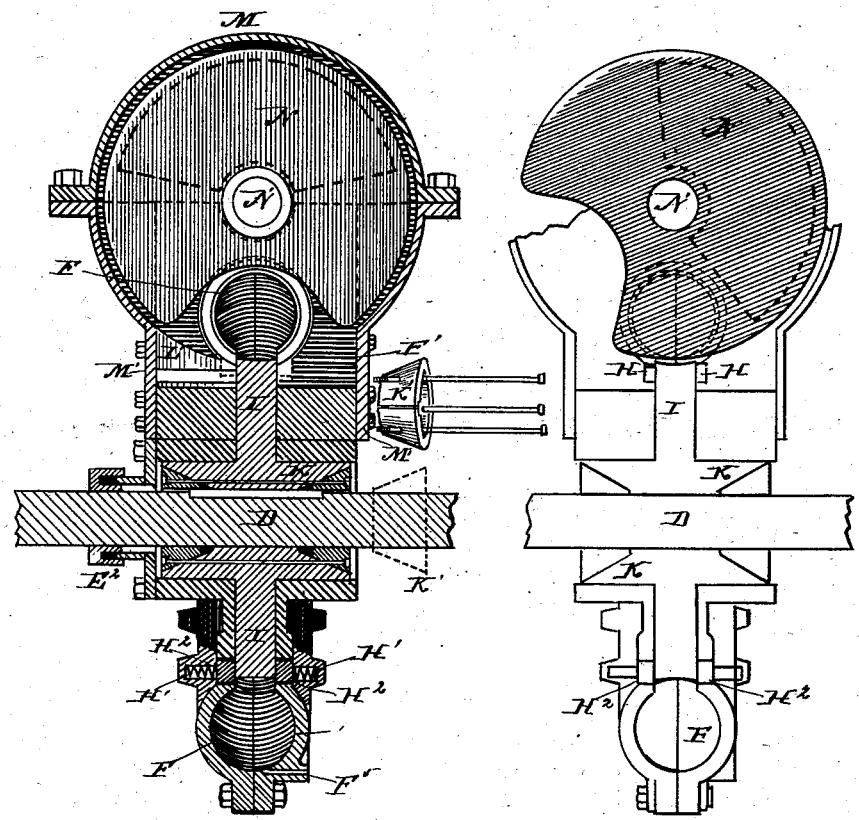
Figures 13, 14, 15, 16:
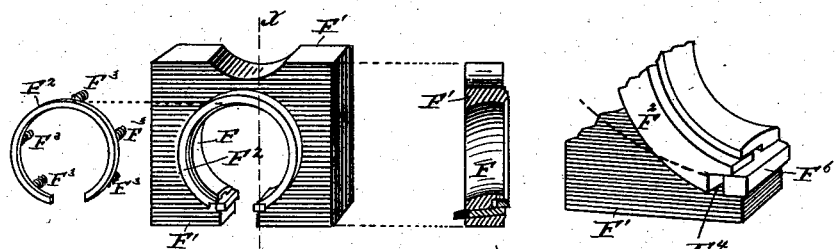
Figure 24:
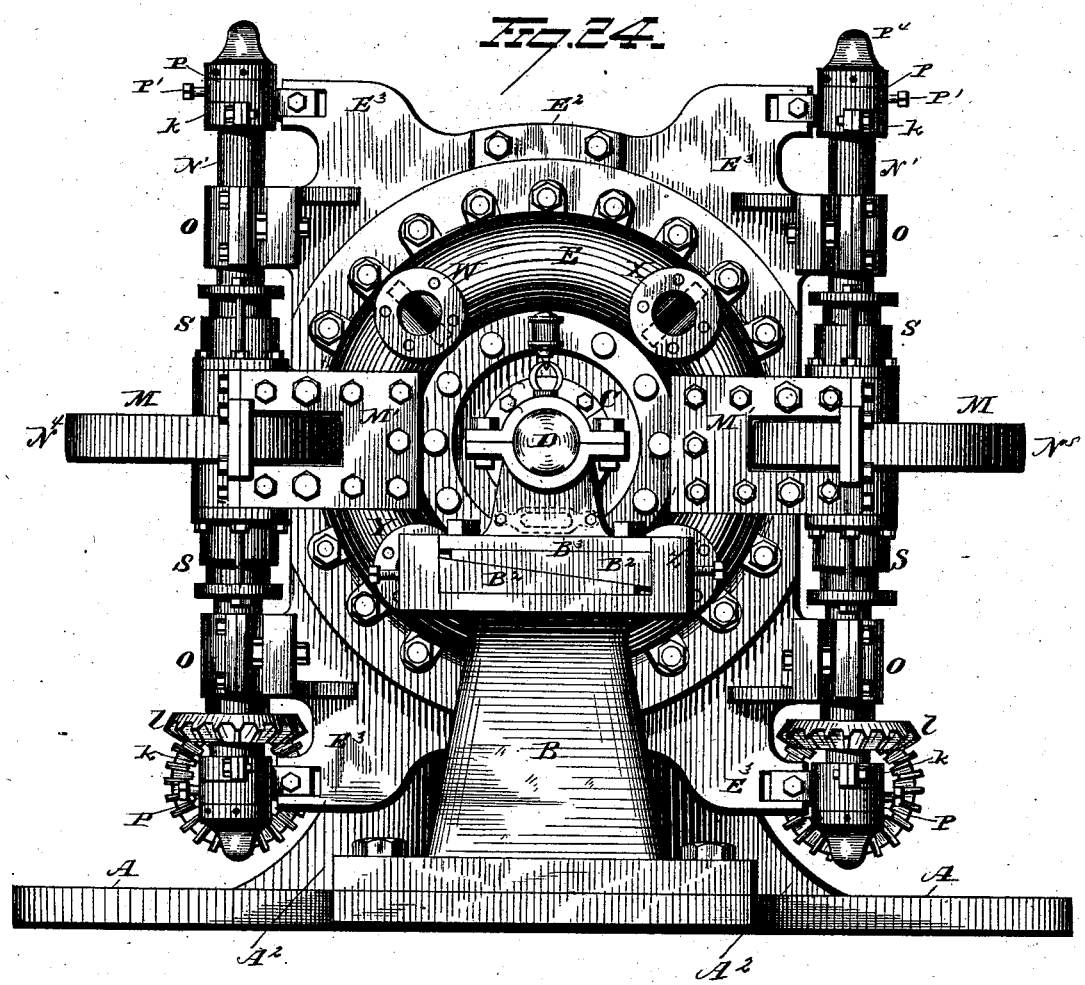

Figure 1 is a front elevation of my engine. Fig. 2 is an end view of the same, the flywheel being shown in dotted lines. Fig. 3 is a view in side elevation of the inner half of the annular cylinder, showing the ports, the cylinder extensions in section, and the piston-disk, the piston-extensions, and centrifugal balance in dotted lines. Fig. 4 is a perspective view of the inside of the annular cylinder, showing the piston-disk and the piston-extensions passing through the cylinder-extensions and the abutment, which is shown in proper position. Fig. 5 is a view of the piston-disk with its extensions, the piston being in position for operation and the cone in the hub of the same, the centrifugal balance being shown in dotted lines. Fig. 6 is a view in side elevation of the piston-ring. Fig. 7 is a side view of the piston. Fig. 8 is the cap-plate of the piston. Fig. 9 is a side view of the shell of the piston. Fig. 10 shows the rings inserted in the piston-shell. Fig. 11 is a vertical section taken through the cylinder and rotary abutment. Fig. 12 is a view in outline of the parts shown in Fig. 11, with the abutment in position to form a cylinder-head. Fig. 13 represents a packing-ring for the cylinder-extension, showing the springs connected therewith. Fig. 14 is a view in perspective of one of the cylinder-extensions. Fig. 15 is a cross-section of Fig. 14 on line $x\,x$. Fig. 16 is an enlarged view of the lower left-hand portion of Fig. 14, showing the appliance for packing the piston-disk in the cylinder-extension. Fig. 17 is a view in cross-section of the cylinder, with the steam-jacket applied to the same. Fig. 18 is a rear view in outline, showing the miter-gears by which the abutment is operated. Fig. 19 is a diminished view of the outside of the cylinder, showing the application of the steam-jacket thereto. Fig. 20 is an enlarged view of the adjustable bearing for the abutment-shaft. Fig. 21 is a view in vertical section of the thrust-bearing for the abutment-shaft, with the check-nut, also the set-screw, disks, and shaft in position. Fig. 22 is a transverse section taken through the block L'. Fig. 23 is a view in side elevation of said block. Fig. 24 is an end view of a modified form of construction of engines embodying my invention.

A represents the bed of the engine, having two outwardly-projecting flanges, A' A', to the outer sides of which are secured the inner sections, E' E', of the annular cylinder F by means of bolts passing through the ears $E^2 E^2$ and flanges A' A', serving to secure them firmly together. The bed A is also provided with stays or braces $A^2 A^2$, to impart additional strength and stiffness thereto.

The standards B, located at opposite ends of the bed A, may be cast integral with the bed A or secured thereto by bolts, as shown in Figs. 1 and 2.

In the upper end of each standard B is formed an elongated seat, B', within which are placed the wedges $B^2 B^2$, with set-screws C C engaging with the thick end of each wedge, as shown in Fig. 2.

Resting upon the flat surface of the upper wedge is the foot $B^3$ of the main bearing C, which foot is adapted to fit in the slot $B^5$ at either end of the elongated seat B'. A movement either forward or backward of the wedges $B^2 B^2$, by means of the set-screws c c, raises or lowers the foot $B^3$, and so adjusts the main bearing C to compensate for any wear thereof. After the bearings C have been adjusted to the proper height the feet $B^3$ are secured in place by means of the tap-bolts $B^6 B^6$, which pass through elongated slots in the wedges $B^2 B^2$ and enter screw-threaded holes in the elongated seat B'.

E and E' are the outer and inner sections of the annular cylinder F, which two sections are firmly secured to each other by means of bolts passing through the flanges of section E into the flange of section E', the inner faces of which flanges are fitted to form a steam-tight joint when thus firmly bolted together. On the opposite sides of the section E' are formed the ears $E^2 E^2$, to secure the same to the flanges A' A', and joined to the upper end of these ears $E^2 E^2$ are the projections $E^3 E^3$, to which are secured the main and thrust bearings of the shaft N' of the abutment-disk N.

In the inner surface of the sections E and E' is formed the annular cylinder F by means of a semicircular groove in each section, which extends entirely around the sections, so that when the two sections E and E' are secured together an annular cylinder, F, is formed therein, the bore of the cylinder being shown in Figs. 11 and 12. In the upper part of the annular cylinder F is a slot, L, extending somewhat below the bore and upward entirely through the annular cylinder F and flanges, which slot is sufficiently wide to allow the two cylinder-extensions F' F' to be fitted into it on either side, sufficient space being provided to allow the abutment-disk N to freely revolve between them, as shown in Fig 4.

In the center of the sections E and E' is a hole or opening, (shown in Fig. 3,) in which the hub K of the piston-disk I is made to revolve, and on the outside it forms a hub, to which the stuffing-box $E^4$ is bolted. Between the two sections E and E' a sufficient space is formed to allow the piston-disk I to freely revolve therein, as shown in Fig. 11. On each section E and E' of the annular cylinder F, just inside the bore and upon the flat surface which comes in contact with the piston-disk I when in position, is a groove, H, extending entirely around the sections E and E', of sufficient width and depth to contain a ring, $H^2$, tightly fitted therein, with tempered-steel coil-springs H' behind the ring $H^2$, which, by engaging against the side of the piston-disk I, near its periphery, prevents the escape of steam to the hub K of the piston-disk I, and also compensates for wear.

At the bottom of the section E' of the annular cylinder F is an opening, $F^5$, (see Fig. 11,) to which is attached a pet-cock, (not shown,) to relieve the annular cylinder F of water of condensation when required.

The cylinder-extensions F' F', Figs. 3, 14, 15, and 16, are fitted within the slot L of the annular cylinder F, so as to be steam-tight, and are secured in proper position by bolts a a a, as shown in Fig. 1, in which position they are bored out at the same time the cylinder F is bored, and constitute a continuation or segment of the cylinder, and their office is to allow of the cutting of a groove, $F^4$, in their inner surface, just around the bore of the annular cylinder F, into which groove $F^4$ is nicely fitted a ring, $F^2$, Fig. 13, and beneath this ring $F^2$ are set, in the groove $F^4$, tempered-steel coil-springs $F^3$, to keep the rings $F^2$ constantly forced against the side surfaces of the abutment-disk N, and so keep it steam-tight while performing the office of a revolving or movable cylinder-head. The bottom of the bore of the cylinder-extensions F' F' is cut away, and within such cut-away portion are snugly fitted the sides of the piston-disk I. On either side of this cut-away section is a slot, $F^4$, in which is fitted steam-tight the metal packing-pieces $F^6$, with springs behind them, (said springs not being shown,) which metal pieces $F^6$ engage against the sides of the revolving piston-disk N and pack it. In fact, they are extensions of the packing-ring $H^2$ $H^2$, set in sections E and E' of the annular cylinder F, and perform the same office. The projections $E^3 E^3$ are purposely attached to the flanges of section E' of the annular cylinder F, to facilitate the removal of section E when desired and allow the section E' to remain in its usual position.

On the outside of section E', surrounding the outside openings from ports X and W, is a flange, to which the valves for ingress and egress of steam are secured. On the outside of sections E and E', surrounding on three sides the slot L, sufficient metal surface is allowed to give the necessary strength to the cylinder at that point, also to allow for firmly securing thereto the pockets M' M', cap M, and stuffing-boxes S.

The piston-disk I consists of a disk of sufficient thickness to insure the strength requisite to carry the piston, the diameter of which disk being just equal to the diameter of the packing-rings $H^2$ in sections E and E' of the annular cylinder F. In the center of the disk I, and on either side, is a hub, K, of sufficient size to allow the main shaft D to pass through it, and yet allow sufficient remaining metal in it to secure the necessary strength. Each end of the opening in the hub K is made funnel shape. The main shaft D is inserted through the hub.

In each end of the hub K is placed a cone, K', which is bored through its center to allow the main shaft D and feather thereon, for which a space is cut, to pass through it easily. The cone is split throughout its length, so that when the two cones K' K' are drawn into the hub K, by means of the bolts shown in Fig. 11, they are made to clasp tightly around the shaft and feather, and thus a strong and durable yet easily-detachable connection is made between the piston-disk I and the main shaft D. The periphery of the piston-disk I is curved to suit the circumferential curve of the abutment-disk N, which revolves across it. (See Figs. 4, 11, and 12.)

On the outer edge of the piston-disk I are formed two segmental extensions, $I^2$ $I^3$, between which is the slot I', in which the piston G is carried. A smaller slot, $I^4$, on one side of the slot I', receives the projection $G^4$ of the piston G, and thus secures it rigidly against any radial movement in the slot I'. The length of the segmental extensions $I^2$ $I^3$ is in the present case about one-fourth of the circumference of the cylinder; but they may be longer or shorter, according to the diameter of the abutment-disk N. These extensions are a little smaller than the bore of the annular cylinder, and are cored out in the center, leaving only metal enough to take the steam-pressure, and are cut away from the slot I' to the end of each to adapt them to the movement of the cut-away section in the abutment-disk N while the piston G is passing through it. (See Fig. 4.) The function of these piston-extensions $I^2$ and $I^3$ is to fill, as far as possible, with hollow metal that space in the cylinder intervening between the port of ingress and the abutment-disk N just at the time when steam is admitted to the annular cylinder F, and hence they serve to reduce the clearance just the bulk of one of these extensions in each annular cylinder at each revolution of the piston G.

On the side of the piston-disk I, between the hub K and slot I', is an opening, b, in which is placed a lever, J, with a movable fulcrum, d, in its center and a rod, e, attached to one end, the opposite end of this rod being attached to the ring $G^3$ of the piston.

This device, as a whole, may be called a "centrifugal balance," and is designed to counteract or counterbalance the effect of centrifugal force applied to the piston-ring $G^2$ when the piston G is revolving rapidly about the annular cylinder F.

It will be seen by the foregoing description that the sides or frame of the piston is rigidly fixed between the piston-extensions $I^2$ $I^3$, the rings $G^2$ and $G^3$ alone being flexible or movable radially. Hence one rod, e, attached to the lever J, is secured to the inner ring, $G^3$, of the piston G through an opening sufficiently large in the bottom or projected part of the outer ring, $G^2$, and the rod e', attached to the other end of the lever J, is attached to a ball, J', of metal, located in the cavity of the piston-extension $I^2$, the weight of which ball J' is equal to the weight of the piston-rings $G^2$ and $G^3$. Hence the action of the centrifugal force on the ball J' is just equal to its force upon the rings $G^2$ and $G^3$, and the movable fulcrum d allows of the proper adjustment to overcome any friction of the rings $G^2$ and $G^3$ between the two heads G' h of the piston G. To adjust this an opening is left in the section E of annular cylinder F, which is covered by a cap, f, bolted on and removable at will. (Shown in dotted lines in Fig. 2.) The ball J' is suspended within the cavity of the extension $I^2$ by a flat steel spring, g, the ends of which are supported by hooks g'. The ends of the spring g are formed with elongated openings to allow of a radially-flexible movement of the ball, and yet cause it to be carried with the piston-disk in either direction.

The piston G is constructed with a plate, h, which is circular except for about one-eighth of its circumference, which projects outwardly for a purpose hereinafter stated. On the back of this plate is a projection, $G^4$, the use of which has already been stated. Upon this plate are five projections or bosses, $G^5$, to which is bolted the corresponding plate, G'. This constitutes the frame of the piston G, the plates G' and h forming what is usually known as "piston-heads." The piston G is further provided with two rings, one, $G^2$, being the outer ring, which is formed to fit the peculiar curve of the annular cylinder F, being concave to fit the inner surface and convex to fit the outer surface of the annular cylinder F.

It will be remembered that the packing-rings $H^2$ in sections E E' of the annular cylinder F were set in somewhat from the bore of the cylinder F, (see Figs. 11 and 12,) to secure sufficient strength of metal between the groove H and the bore of the annular cylinder F.

In order to compensate for the wear between the disk I and that part of the annular cylinder F which is situated between the bore and the groove H, the outer piston-ring, $G^2$, is extended down into the piston-disk I far enough so that its projected part shall cover such intervening space, and as the ring G² is split at the bottom it is made to compensate for wear not only around the bore of the cylinder F, but also so far down into the space formed for the admission of the piston-disk I as is necessary to secure a steam-tight and wearing fit. For this purpose the outer piston ring, G², is cast of greater diameter than the bore of the cylinder, and in the projection thereof a groove is planed out of it from opposite sides to form the cut $i$. (Shown in Fig. 10.) It is then compressed and its outer and inner surfaces turned, as required, so that when it is put in its proper position it must be compressed to be put into the cylinder and will expand in the projection to pack the aforesaid intervening space. The inner ring, G³, is of greater outer diameter than the inner diameter of ring G², and is cut and then compressed, and the outside turned to fit the inside diameter of ring G². The ring is then turned on the inside eccentric, so that when it is placed on the inside of ring G² the expansion of both rings will secure a uniform expansion of the entire circle of the outer ring. Should the bore of the cylinder F wear unequally, this can be obviated by varying the shape of the inner ring. This device, in connection with the centrifugal balance, before described, causes the annular cylinder F to wear in a circle in its circumferential contact with the piston G.

The peculiar form of the cut $i$ in the projected section of the ring G² prevents the escape of any steam through it should the piston G for any reason become filled with steam, since the edges of the ring G² form a ground or steam-tight joint between the piston-heads G′ and $h$, which heads are provided with extensions like that in ring G².

In order to secure a proper speed of the piston and not necessitate too large a circle of the annular cylinder F, the abutment should have a continuous movement simultaneous with the piston. For this reason I use a revolving abutment, thus avoiding any reciprocating motion, which latter greatly retards the speed and is more liable to become impaired in use. This abutment N consists of a disk whose diameter is three times or more the diameter of the bore of the annular cylinder F. A shaft, N′, passes through the hub of the disk N, to which it is firmly secured. The disk N is of sufficient thickness to secure the necessary strength of metal, so that it will not spring or break under the pressure of steam. A section is cut away from the disk N, as shown in Figs. 4, 11, and 12, sufficiently large to allow the piston G to pass while the disk N is in motion and not come in contact with it. Opposite the cut-away section the disk N is cored out sufficiently to offset the metal cut away, so it will be balanced in itself and capable of great speed thereby. The periphery of the disk N is curved to match the circumference of the piston-disk I, across which it revolves. As both disks move together, the movement is a spiral or diagonal movement, and well adapted to form a nice surface on the line of contact between the two.

The shaft N′ rests in the adjustable bearings O O, which bearings are secured by bolts to the brackets E⁴ E⁴ of the projections E² E³ of section E′ of the annular cylinder F. (See Figs. 1 and 2.) The bearings O O, like the main-shaft bearings C C, rest upon wedges, which furnish ample means for a fine adjustment (see Fig. 1) by means of set-screws $o'$ and tap-bolts $o^2$. The ends of the shaft N′ rest in the thrust-bearings P P, which bearings are secured to the projections E³ E³ by bolts which hold them in the slots, to which their lower projection is nicely fitted, and allow of any vertical adjustment desired. Thus it will be seen that the abutment-disk N can be very nicely adjusted in its contact with the piston-disk I by the use of the set-screws $o'$ and tap-bolts $o^2$. (See Fig. 1.)

The bearing O is shown in detail in Fig. 20. It may be of any desired length and be babbitted or made solid, as preferred. The thrust-bearings P P are shown in detail in Fig. 21. The shaft N′ is made to project partly into the thrust-bearing P, its end pressing against the outer face of one of three (more or less) hardened steel or case-hardened iron disks P², of the diameter of the shaft N′ or less. These disks are provided with a slot (not shown) in them to aid in lubrication, and they in turn rest against the face of a thrust-bearing disk, P³, having a long screw, $j$, projecting from its center, which is fitted into the rear part of the bearing P, and is adjustable by means of a wrench applied to the outer square end of the same when the check-nut P⁴ is removed and the set-screw P′ is loosed. A cap, $k$, covers that part of the bearing P in which the end of the shaft N′ and the disks P² are placed. By this means the abutment-disk N is very finely adjusted between the rings F³ of the cylinder-extensions F′ F′. This device also provides for any wear between the end of shaft N′ and the disks P² or thrust-bearing disk P³.

In the rear, as seen in Fig. 18, there is a miter-gear, $l$, secured to the shaft N′, which revolves the abutment-disk N, which gear is made to revolve by means of similar gears on shafts Q and Q′, which connect with the like gear on the main shaft D, so that the abutment-disk N is made to revolve simultaneously with the main shaft D, and as both piston and abutment have a continuous movement any desired speed of piston or of the main shaft is attainable, and as the movements are steady and no unequal strain is placed on any one part of the engine it is not liable to get out of order. By enlarging the circle of the annular cylinder a greater leverage is obtained between the piston and main shaft. Hence the power is increased at will.

The shaft N′ is provided with stuffing-boxes S S, which are secured by bolts to the top of the annular cylinder F and the bottom of the cap M, so as to allow of the shaft N′ being lowered when desired to take up for any wear between the two disks I and N.

To avoid any tendency of the rings F² F² being displaced by the action of the springs F³ during the passage of the cut-away section of the abutment-disk N, a device (shown in Figs. 22 and 23) is introduced into the slot L between the two cylinder-extensions F' F', which device consists of a block, L', of iron or other metal, adapted to fill the space before mentioned, (see L', Fig. 11,) near the bottom of which block is a groove, L², extending entirely through the block for about one-half the length of the block, and from thence to the outer end the bottom of the groove is wedge-shaped, coming nearly to the surface at the outer end.

Fastened to the wide end of the block L' by screws is a spring, L³, extending in the groove L² the full length of the block L', so that its extreme inner ends shall engage with that part of the rings F² F² extending below the line at which the periphery of the abutment-disk N passes the ring F². (See Fig. 16.) The screws L⁴ L⁴, passing through the movable wedge-shaped pieces L⁵ L⁵, adjust the ends of the springs L³, which in turn adjust the rings F² F², so that the cut-away section of the abutment-disk N shall closely shear by the rings F² F², and so avoid any concussion which might otherwise occur.

In Figs. 17 and 19 is shown the manner in which a steam-jacket can be very easily applied to the cylinder when that method of protection is preferred to a covering of the cylinder by some non-conducting material so much in general use.

The valves used on this engine are hollow piston-valves, with ports of equal size on each side corresponding with like ports in the valve-cylinder, so that the valve is balanced whether allowing the steam to pass into the annular cylinder F or withholding it therefrom.

A simpler form of centrifugal balance may be used than that shown in Fig. 5 when only one speed of piston is required, as in the case of stationary engines, and may be described as follows: a wide steel spring, in shape like the letter C, with a hole in the back through which passes the rod e', Fig. 5, with check-nuts thereon engaging against the outside of the spring, which spring, being placed in the opening, is made to act with greater or less force upon the rod e' and piston-rings G² G³ by means of the check-nuts, which are adjustable through the opening in the cylinder, (shown in dotted lines in the cut-away section in the lower portion of the bearing C, Fig. 2.)

All of the moving parts of the engine are finely adjustable, and full provision is made to compensate for wear.

Although two cylinders are shown in Fig. 1, but one cylinder is necessary in cases where a fly-wheel can be used to carry the piston over the dead-centers, as in the case of stationary engines. In the engine shown in Fig. 1 the main shaft D is made to revolve in but one direction; but by using valves with both inlet and exhaust ports therein the direction of the piston and main shaft can be reversed at will. Besides the bearings C' for the main shaft, (shown in Figs. 1 and 2,) there are two other adjustable bearings between the two cylinders, Fig. 1, said bearing not being shown. In Fig. 24 is shown a modified form of the engine, in which one cylinder is used instead of two, and two abutments are used and preferably situated on opposite sides of the cylinder F. The two ports W and X sustain the same relation to the abutment in the matter of position as in the double engine shown, and there are two other ports, Y and Z, situated in like position. By this form of construction greater simplicity is attained, it is more compact, and it costs less to build it, and while it secures the same efficiency it saves the friction on one piston. To understand its operation, let it be borne in mind that the left-hand abutment, N⁴, has just closed, and steam is being admitted at port W, driving the piston (which has passed that port) from left to right or toward port X, which port remains open until the abutment N⁵ begins to open, when the port X will close and remain closed until the piston has passed the abutment N⁵, and just at the time the abutment N closes behind the moving piston, and while the space between said abutment and the piston is filled with part of the steam admitted at port W the valve X opens to exhaust the steam contained in the cylinder F, which steam has just forced the piston G past the abutment N⁵, at the same time the valve Z opens to admit live steam into the space behind the piston, already filled with attenuated steam, which newly-admitted steam in turn forces the piston along the cylinder F, in the same direction as before, past the lately-open but now closed port Y and the lately-closed but now open abutment N⁴, which immediately closes behind the piston G, when the same process of simultaneously admitting steam in front of the abutment and exhausting it behind takes place. Hence steam is admitted twice into the cylinder at each revolution, and by this means a constant steam-pressure is maintained against the piston during the entire revolution and without interfering with the continuous movement of the piston in one direction, and also without detriment to the facility of the engine for automatic cut-off and expansion of steam.

By a proper arrangement of valves—such as having the inlet-valves on section E' of the annular cylinder and the exhaust-valves on section E of the annular cylinder—the engine can be run in either direction by a simple change in the direction of the steam.

All of the features of the annular cylinder, the piston, the piston-disk, the abutment, the centrifugal balance, the cylinder-extension, the adjustable bearings, the packing-rings, and devices for compensating for wear in the double engine (shown complete in Fig. 1,) apply to the modified form of construction, which, in reality, simply eliminates one cylinder and one piston and their necessary concomitants.

Having fully described my invention, what I claim as new, and desire to secure by Letters Patent, is—

1. In a rotary engine, the combination, with a revolving piston, of a rotary disk-abutment arranged at right angles to the rotary piston, and suitable mechanism for imparting a continuous rotary motion thereto, substantially as shown and described, and for the purposes herein set forth.

2. In a rotary engine, the combination, with a rotary piston-disk, of a rotary abutment-disk arranged at right angles to the rotary piston-disk, and suitable mechanism for imparting a continuous rotary motion thereto, and having the periphery of said abutment arranged to snugly fit against the periphery of the piston-disk, substantially as shown and described, and for the purposes herein set forth.

3. In a rotary engine, the combination, with a rotary piston-disk having a concave periphery, of a rotary disk-abutment arranged at right angles to the piston-disk, and provided with a concave periphery and suitable mechanism for imparting a continuous rotary motion thereto, substantially as shown and described, and for the purposes herein set forth.

4. In a rotary engine, the combination, with a revolving piston and tapered piston-extensions, of a rotary disk-abutment arranged at right angles to the piston-disk, substantially as shown and described, and for the purposes herein set forth.

5. In a rotary engine, the combination, with a self-adjusting piston, of a rotary disk-abutment arranged to revolve at right angles to the line of movement of said piston, substantially as shown and described, and for the purposes herein set forth.

6. In a rotary engine, the combination, with the cylinder provided with an annular bore made circular in cross-section, of a rotary disk-abutment arranged to rotate at right angles to the annular bore and to open and close the same, and with suitable mechanism for imparting a continuous rotary motion thereto, substantially as shown and described, and for the purposes herein set forth.

7. In a rotary engine, the combination, with a rotary piston-disk, of a rotary disk-abutment arranged at right angles to the piston-disk, and cylinder-extensions located at opposite sides of said abutment and extending toward the center of the cylinder, substantially as shown and described, and for the purposes herein set forth.

8. In a rotary engine, the combination, with a cylinder and revolving piston, of a revolving disk-abutment arranged at right angles to the revolving piston and cylinder extensions, provided with a self-regulating packing-ring, substantially as shown and described, and for the purposes herein set forth.

9. In a rotary engine, the combination, with a cylinder and revolving piston and piston-disk, of a rotary disk-abutment arranged at right angles to the revolving piston and cylinder extensions, provided with self-adjusting packing for packing the sides of the abutment and piston-disk, substantially as shown and described, and for the purposes herein set forth.

10. In a rotary engine, the combination, with a rotary piston-disk provided with piston-extensions, and self-adjustable piston located between the adjacent ends of said extensions, of a rotary disk-abutment arranged at right angles to the rotary piston and provided with an irregularly-curved cut-away portion for the passage of said piston and piston extensions, substantially as shown and described, and for the purposes herein set forth.

11. In a rotary engine, the combination, with a revolving piston, of a rotary disk-abutment mounted on a shaft and arranged at right angles with the revolving piston, and devices for imparting vertical adjustment to said shaft and rotary disk-abutment, substantially as shown and described, and for the purposes herein set forth.

12. In a rotary engine, the combination, with a revolving piston, of a rotary disk-abutment mounted on a shaft, and devices for imparting longitudinal adjustment to said shaft, substantially as shown and described, and for the purposes herein set forth.

13. In a rotary engine, the combination, with a revolving piston, of a rotary disk-abutment mounted on a shaft, and bearings for receiving the end-thrust of said shaft, substantially as shown and described, and for the purposes herein set forth.

14. In a rotary engine, the combination, with a rotary piston-disk, of a piston provided with an expansible packing-ring formed with a projection which fits into a recess in the piston-disk, substantially as shown and described, and for the purposes herein set forth.

15. In a rotary engine, the combination, with a rotary piston-disk, of a piston connected therewith, said piston being provided with an expansible packing-ring constructed with a projection that is split by vertical and horizontal walls, substantially as shown and described, and for the purposes herein set forth.

16. In a rotary engine, the combination, with the main driving-shaft and the shaft carrying the rotating abutment, arranged at right angles with the revolving piston, of intermediate gearing for transmitting a positive motion to the rotary abutment-shaft from the main driving-shaft, substantially as shown and described, and for the purposes herein set forth.

17. In a rotary engine, the combination, with the revolving piston-disk, of a self-adjusting piston and devices for counteracting the effect of centrifugal force exerted on the piston, substantially as shown and described, and for the purposes herein set forth.

18. In a rotary engine, the combination, with a rotary piston-disk, of a piston, a weight, lever, and connecting-links for counterbalancing the piston, substantially as shown and described, and for the purposes herein set forth.

19. In a rotary engine, the combination, with a rotary piston-disk and a hollow piston-extension, of a weight located in the hollow piston-extension, and links and a lever for connecting the piston and weight, substantially as shown and described, and for the purposes herein set forth.

20. In a rotary engine, the combination, with a rotary piston-disk and a lever provided with an adjustable fulcrum located within a slot or opening in said piston-disk, of a piston connected by a rod to one end of said lever and a weight connected by a rod to the other end of said lever, substantially as shown and described, and for the purposes herein set forth.

21. In a rotary engine, the combination, with a rotating piston-disk and a piston provided with two expansible rings, of devices connected with the inner expansible ring for counterbalancing the action of centrifugal force on the piston, substantially as shown and described, and for the purposes herein set forth.

22. In a rotary engine, the combination, with the driving-shaft and rotary piston-disk having conical recesses in the ends of its hubs, of split conical rings and bolts for securing the piston-disk to the shaft, substantially as shown and described, and for the purposes herein set forth.

23. In a rotary engine, one section of the cylinder having the projections $E^3$ cast solid therewith, said projections being constructed to receive the bearings of the rotary disk-abutment shaft arranged to revolve the said abutment at right angles with the revolving piston, substantially as shown and described, and for the purposes herein set forth.

24. The combination, with the packing-rings of the cylinder-extensions, of devices for regulating the inward pressure on said packing-rings, substantially as shown and described, and for the purposes herein set forth.

25. The combination, with the packing-rings of the cylinder-extensions, of the springs $L^3$ and adjustable wedges $L^5$, substantially as shown and described, and for the purposes herein set forth.

26. The combination, with the packing-rings of the cylinder-extensions, of the block $L'$, the springs $L^3$, wedges $L^5$, and set-screws $L^4$, substantially as shown and described, and for the purposes herein set forth.

27. The rotary abutment-disk, cut away on one side for the passage of the piston and cored out on its opposite side to balance the disk, substantially as shown and described, and for the purposes herein set forth.

In testimony whereof I have signed this specification in the presence of two subscribing witnesses.

LEANDER J. WING.

Witnesses:
D. P. COWL,
GEO. R. BYINGTON.